3,026,318
NEW 16-HETEROCYCLIC AMINO STEROIDS
Colin Leslie Hewett, London, England, assignor to Organon Inc., West Orange, N.J., a corporation of New Jersey
No Drawing. Filed July 25, 1960, Ser. No. 44,861
Claims priority, application Great Britain July 23, 1959
7 Claims. (Cl. 260—239.5)

This invention relates to certain novel steroid compounds, substituted in 16-position by a nitrogen containing group and to processes for the preparation thereof.

A large number of alkaloids are known which show a structural relationship with steroids. These steroidal alkaloids which have mainly been isolated from Solanum-, Veratum- and Holarrhena species, are in general characterized by the fact that ring D of the steroid skeleton is connected with a nitrogen-containing ring system. As examples of such alkaloids are mentioned solanidine, rubijervine, and conessine. The properties of these compounds are determined by the combination of the steroid skeleton and the basic ring, as well as by the components bound glycosidically to these compounds. A survey of these steroidal alkaloids is given by L. F. Fieser and M. Fieser in "Natural Products Related to Phenanthrene," 3rd ed., page 597 and following pages.

As the said group of alkaloids contains therapeutically valuable compounds, but because the synthesis thereof cannot be realised owing to their complicated structures the investigation has mainly been directed to the preparation of simpler steroids substituted by nitrogen-containing groups.

According to the invention, therefore, we provide a process for the preparation of steroids, substituted in 16-position by a nitrogen-containing group comprising reacting a 16-halo steroid either with an alkali metal salt of phthalimide followed, if desired, by saponification or with a compound of the formula: $HNR_1R_2$, in which $R_1$ and $R_2$ represent hydrogen, or a lower alkyl group, or a substituted lower alkyl group, or in which $NR_1R_2$ represents a heterocyclic amino radical. If desired, the thus obtained 16-amino steroids may be converted into salts.

The 16-halo steroid applied as starting product in this process may be a 16-chloro- or preferably a 16-bromo steroid.

Also according to this invention, we provide a process for the preparation of steroids, substituted in 16-position by a nitrogen-containing group, comprising reacting a 16-bromo steroid, substituted in 17-position by a keto group, or a free or esterified hydroxyl group either with an alkali metal salt of phthalimide followed, if desired, by saponification or with a compound of the formula: $HNR_1R_2$, in which $R_1$ and $R_2$ represent hydrogen, a lower alkyl group, or a substituted lower alkyl group, or in which $NR_1R_2$ represents a heterocyclic amino radical. If desired, the thus obtained 16-amino-17-oxygenated steroids may be converted into salts.

The compound applied in the latter reaction used as starting material of the formula $HNR_1R_2$ is preferably selected from the group embracing $NH_3$, $NH_2$(lower alkyl, $NH$(lower alkyl)$_2$, $NH(CH_2CH_2OH)_2$, $NH_2CH_2COOH$ morpholine and piperidine.

Also in accordance with this invention, we provide a process for the preparation of novel steroid compounds of the general formula:

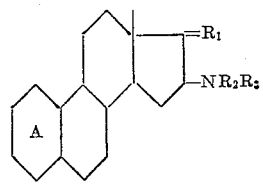

in which $R_1$ is selected from the group consisting of $H(\alpha OH)$, $H(\beta OH)$, $H(\alpha Oacyl)$, $H(\beta Oacyl)$ and $=O$, $NR_2R_3$ is selected from the group consisting of $NH_2$, $NH$(lower alkyl), $N$(lower alkyl)$_2$, $N(CH_2CH_2OH)_2$, $NHCH_2COOH$, morpholino-, and a piperidino radical, and salts of these compounds, and Ring A has one of the following configurations:

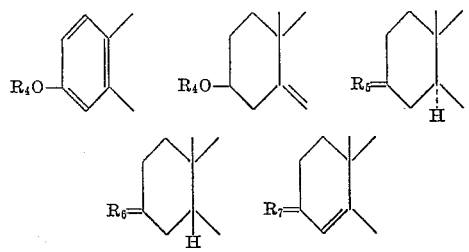

in which $R_4$ is selected from the group consisting of H, an acyl, or a hydrocarbon radical, $R_5$ is selected from the group consisting of $H(\beta OH)$, $H(\beta Oacyl)$, and $=O$, $R_6$ is selected from the group consisting of $H(\alpha OH)$, $H(\alpha Oacyl)$, and $=O$ $R_7$ is selected from $H(OH)$ and $=O$ comprising reacting a 16-halo steroid, substituted in 17-position by a keto group, a free or esterified hydroxyl group with a compound selected from the group embracing $NH_3$, $NH_2$(lower alkyl), $NH$(lower alkyl)$_2$, $NH(CH_2CH_2OH)_2$, $NH_2CH_2COOH$, morpholine and piperidine. The thus obtained 16-amino steroid may be converted, if desired, by methods known per se into other products according to the General Formula I.

The new compounds of the present invention are important biologically active compounds. They possess tranquillising, anti-cholinergic, and spasmolytic activities.

The 16-halo steroids to be applied as starting materials in processes according to the invention can be prepared by enol acylating a 17-keto steroid and treating the thus obtained $\Delta^{16}$-17-acyloxy steroid with a halogenating agent, as a result of which a 16-halo-17-keto steroid is obtained.

The enol acylation can be performed according to a method known per se, for example by reacting the 17-keto steroid with isopropenyl acetate in the presence of an acid catalyst. Together with the enol acylation of the 17-keto group esterifiable hydroxyl groups which may be present in the molecule, for example a 3-hydroxy group, are esterified.

The subsequent halogenation may be effected by reacting the $\Delta^{16}$-17-acyloxy steroid with a solution of the halogen in a suitable organic solvent, for example a solution of bromine in methylene dichloride, or by dissolving the steroid in a suitable organic solvent and leading through this solution a stream of the halogen gas.

Another known halogenation reaction comprises the treatment of the Δ¹⁶-17-acyloxy steroid, preferably dissolved in an organic solvent, such as a lower aliphatic alcohol, dioxane or acetone, with a hypohalous acid, such as hypochlorous or hypobromous acid. The 16-bromo-17-keto steroid thus obtained is subsequently reacted with an amino compound, such as NH(CH₃)₂, NH(CH₂H₅)₂, morpholine or piperidine, in which the 16-amino substituted 17-keto steroid is obtained with the elimination of hydrogenbromide.

After the formation of the 16-amino steroid further known conversions in the molecule can be performed, if desired, for example hydrolysis of a possibly present 3-acyloxy group and, if desired, a subsequent oxidation, for example by an Oppenauer oxidation, to a 3-keto group. It is also possible to reduce the 17-keto group and/or any 3-keto group which may be present and then esterifying, if desired, the resulting 17-hydroxy- or 3,17-dihydroxy steroid.

The above conversions, especially the reduction of the 17-keto group to a 17-hydroxyl group and a following esterification, if any, may also be performed before the condensation reaction of the 16-bromo steroid with the amino compound takes place.

In the reactions described above between a 17-oxigenated-16-halo steroid and an amine, starting from a 17-keto-16β-halo compound, the corresponding 16β-amino compound is mainly obtained. Starting from a 17β-hydroxy-16α-halo compound, the corresponding 16β-amino compound is mainly obtained, and if a 17β-hydroxy-16β-halo compound is used as starting product, the corresponding 16α-amino derivative is mainly formed.

The 16-amino substituted steroids according to the invention can also be obtained in different manners, for example by converting a Δ¹⁶-steroid by means of oxidation agents, such as monoperphthalic acid, into the 16,17-oxido compound and reacting the latter with an amino compound, as a result of which a 16-amino-17-hydroxy compound is obtained. Another method comprises the reduction of a 16-oximino compound, obtained by reaction of a 17-keto steroid with for example iso-amylnitrite, as a result of which a 16–NH₂-steroid is obtained.

Any 16-amino compound obtained according to any of the above methods can be converted, in a manner known per se, into a salt thereof, for example an organic acid salt, such as a citrate or pyruvate, an inorganic acid salt, such as the hydrochloride or an alkylhalogenide thereof.

The following examples illustrate the invention.

Example I

A solution of 50 gm. of Δ¹⁶-3β,17-diacetoxy-androstene in 300 ml. of methylene dichloride is cooled to —15° C., after which a solution of 7.5 ml. of bromine in 25 ml. of methylene dichloride is added while stirring vigorously. Immediately thereafter the solution is evaporated nearly to dryness under reduced pressure, after which the residue is recrystallised from ether. There are obtained 52 gm. of the 3β-acetoxy-16α-bromo-17-keto-androstane of melting-point 172° C.

15 gm. of this compound are dissolved in 90 ml. of piperidine, after which this solution is refluxed for one hour. The majority of piperidine is then distilled off under reduced pressure and the remaining solution is diluted with water. The precipitate is dissolved in 150 ml. of methanol and boiled for 30 minutes with a solution of 2 gm. of potassium hydroxide in 2 ml. of water. Then the product is precipitated with water and crystallised from acetone, yielding the 3β-hydroxy-16β-piperidino-17-keto-androstane of melting-point 170–175° C.

The hydrochloride of this compound is formed by dissolving the 3β-hydroxy-16β-piperidino-17-keto-androstane in methanol, adding concentrated hydrochloric acid and then evaporating the methanol under reduced pressure. The hydrochloride of 3β-hydroxy-16β-piperidino-17-keto-androstane, melting-point 265° C. is thus obtained.

4 gm. of the 3β-hydroxy-16β-piperidino-17-keto-androstane are dissolved in 25 ml. of methanol and then stirred for 3 hours with 1.5 gm. of potassium borohydride. The reduced compound is precipitated by the addition of water and crystallised from methanol to give the 3β,17β-dihydroxy-16β-piperidino-androstane of melting-point 185° C.

Example II

To a suspension of 36 gm. of 3β-acetoxy-16α-bromo-17-keto-androstane, obtained according to the process of Example I, in 1,000 ml. of methanol are added 10 ml. of 50% sulphuric acid, after which the reaction mixture is refluxed for 3 hours. Then the solution is evaporated to 600 ml. and the precipitate is filtered. This precipitate is crystallised from methanol when 28.5 gm. of the 3β-hydroxy-16α-bromo-17-keto-androstane are obtained of melting-point 174° C.

To a solution of 24 gm. of this compound in 150 ml. of methylene dichloride and 200 ml. of acetic acid a solution of 5.25 gm. of chromium trioxide in 100 ml. of 80% acetic acid is added while stirring. The mixture is then stirred at room temperature for 90 minutes and then evaporated until the methylene dichloride has been removed. The oxidised compound is then precipitated by the addition of water. The precipitate is sucked off and crystallised from ether yielding 22.5 gm. of the 3,17-diketo-16α-bromo-androstane of melting-point 185–187° C.

A mixture of 15 gm. of this compound and 100 ml. of piperidine is refluxed for 1 hour and then concentrated under reduced pressure. The residue is extracted with 1% hydrochloric acid solution, filtered hot and the filtrate is basified. The precipitate is collected and chromatographed over a column of alumina in benzene, the benzene is distilled off and the residue is crystallised from methanol. There is obtained the 3,17-diketo-16β-piperidino-androstane of melting-point 137° C. The hydrochloride of this compound has a melting-point of 260–270° C.

Reduction of this compound with potassium borohydride after protection of the 3-keto group by formation of a ketal yields the 3-keto-16β-piperidino-17β-hydroxy-androstane, M.P. 177°. The hydrochloride has a melting point of 305° C. (decomposition).

Example III

In accordance with the processes described in Examples I and II the 3β-hydroxy-16β-morpholino-17-keto-androstane has been prepared by reacting the corresponding 16-bromo compound (19 gm.) with 60 ml. of morpholine. The melting-point of the former is 192–197° C. The hydrochloride has a melting-point of 265° C.

By reduction of this compound of sodium borohydride the 3β,17β-dihydroxy - 16β - morpholino-androstane has been prepared. Melting-point 265° C. The hydrochloride has a melting-point of 320° C. The citrate has M.P. 260°.

In an analogous manner the 3,17-diketo-16α-bromo-androstane has been converted into the 3,17-diketo-16β-morpholino-androstane. Melting-point 230° C. The hydrochloride has a melting-point of 225° C.

By reduction of this compound (17.5 gm.) with 2 gm. of potassium borohydride after protection of the 3-keto group by formation of a ketal the 3-keto-16β-morpholino-17β-hydroxy-androstane has been obtained, melting-point 209–210° C.

Example IV

A solution of 7 gm. of 3,17-diketo-16β-morpholino-androstane in 70 ml. of methyl iodide is maintained at room temperature overnight, then diluted with a little ether and filtered. The precipitate is crystallised from 400 ml. of boiling water, yielding the N-methyl:N-16β (3:17-diketo-androstanyl)-morpholinium iodide of melting-point 255–257° C.

The foregoing iodide is dissolved in 300 ml. of boiling water and treated with silver hydroxide. The solution is filtered, concentrated under reduced pressure to 50 ml. and kept at 0° C. for 2 days.

The solution is filtered and the filtrate lyophilized to a hygroscopic almost colourless powder consisting of N-methyl-N-16β(3:17-diketo-androstanyl)-morpholinium hydroxide.

In corresponding manner have also been prepared the N-methyl:N-16β(3-keto-17β-hydroxy-androstanyl)-morpholinium iodide (melting-point 238–240° C. decomposition) and N-methyl:N-16β(3-keto-17β-hydroxy-androstanyl)-morpholinium hydroxide.

*Example V*

3β-hydroxy-16α-bromo-17-keto-androst-5-ene (Ellis, Patel and Petrow, J. Chem. Soc. 1958, 800) was reacted with 3 volumes of morpholine to yield 3β-hydroxy-16β-morpholino-17-keto-androst-5-ene M.P. 200° C. which is converted by reduction with potassium borohydride in methanol solution into the corresponding 17β-hydroxy compound M.P. 190° C.

In an analogous manner 3β-hydroxy-16β-piperidino-17-keto-androst-5-ene (M.P. 170° C.) and 3β:17β-dihydroxy-16β-piperidino-androst-5-ene (M.P. 228–230° C.) have been prepared.

*Example VI*

16α-bromo-3:17-diketo-androst-4-ene (ibid) was reacted with 4 volumes of morpholine and the product isolated as before to yield 16β-morpholino-3:17-diketo-androst-4-ene, M.P. 198–200° C. Reduction with potassium borohydride in methanol gave a Δ⁴-diol M.P. 252–253° C. This diol (11.0 gms.) was dissolved in toluene (750 cc.) and cyclohexanone (110 cc.) and boiled under reflux for 20 minutes with aluminum isopropoxide (5.5 gms.). After cooling the basic material was extracted with very dilute hydrochloric acid to yield 16β-morpholino-testosterone M.P. 191–193° C.

In a similar manner 16β-piperidino-3:17-diketo-androst-4-ene, M.P. 164–165° and 16β-piperidino-testosterone, M.P. 171–172° C., were prepared.

*Example VII*

16-bromo-3β:17-dihydroxy-androst-5-enes. (a) 16α-bromo-3β-hydroxy-17-keto-androst-5-ene (5 gm.) in methanol (100 cc.) was reduced with potassium borohydride (1.3 gm.) over 2 hours at pH 7.0 the pH being maintained by the addition of acetic acid after each addition of potassium borohydride. The reduction product was isolated by addition of water and recrystallised from methanol to give 16α-bromo-3β:17α-dihydroxy-androst-5-ene M.P. 239–240°. From the mother liquors was isolated 16α-bromo-3β:17β-dihydroxy-androst-5-ene M.P. 184–185°. (b) 16α-bromo-3β-hydroxy-17-keto-androst-5-ene (5 gm.) in methanol (100 cc.) was made alkaline by the addition of 0.1 cc. of 50% potassium hydroxide solution and reduced with potassium borohydride (1.0 gm.) over 40 minutes. The mixture of bromo diols was isolated by addition of water and recrystallised from aqueous methanol to give 16β-bromo-3β:17β-dihydroxy-androst-5-ene M.P. 180–182°. From the mother liquors was isolated an impure specimen of 16β-bromo-3β:17α-dihydroxy-androst-5-ene M.P. 161–165° C.

16α-bromo-3β:17β-dihydroxy-androst-5-ene (0.25 gm.) and piperidine (2.5 cc.) were boiled under reflux for 3 hours and the basic material separated which after recrystallisation yielded 16β-piperidino-3β:17β-dihydroxy-androst-5-ene, M.P. 225–228° C. identical with that described under Example V.

16α-bromo-3β:17α-dihydroxy-androst-5-ene (0.25 gm.) and piperidine (2.5 cc.) were boiled under reflux for 3 hours to give 16β-piperidino-3β:17α-dihydroxy-androst-5-ene diol M.P. 239–240° C.

16β-bromo-3β:17β-dihydroxy-androst-5-ene (0.2 gm.) and piperidine (5 cc.) were boiled under reflux for 12 hours and the basic material isolated in the usual manner. Recrystallisation from methanol gave 16α-piperidino-3β:17β-dihydroxy-androst-5-ene, M.P. 239–241° C. depressed by the foregoing amine.

By means of an Oppenauer oxidation the end products, prepared according to the method of this example, have been converted into the corresponding Δ⁴-3-keto-androstene compounds.

*Example VIII*

A mixture of 60 gm. of 3α-acetoxy-17-keto-etiocholane (melting-point 98–99° C.); 420 ml. of isopropenyl acetate, and 5 ml. of 2% $H_2SO_4$ in isopropenyl acetate was boiled for 2 hours with slow fractionation of 25 ml. Further isopropenyl acetate (25 ml.) was added and 2 ml. of catalyst and distillation continued a further 2 hours. The solution was then concentrated under reduced pressure, ether added and the ethereal solution washed with dilute $NaHCO_3$ solution. The solution was distilled to dryness, dissolved in hexane and passed through a column of alumina. The hexane was distilled off and the residue crystallised from methanol to give 30.8 gm. of Δ¹⁶-3α:17-diacetoxy-etiocholene with melting-point 90–91° C., depressed by mono-acetate.

A solution of 34.7 gm. of the foregoing diacetate in 335 ml. methylene dichloride was cooled to −10° and 5.2 ml. of bromine in 60 ml. of $CH_2Cl_2$ are added all at once with stirring. The solution was then distilled to dryness under reduced pressure and the residue washed with a little ether to give the 3α-acetoxy-16α-bromo-17-keto etiocholane with melting-point 217–218° C.

The free compound obtained after hydrolysis with sulphuric acid has a melting point of 212–213° C. Oxidation of this compound by means of chromium trioxide yields the 3:17-diketo-16α-bromo-etiocholane, melting-point 194–196° C.

In accordance with the process described in Example I the above 16α-bromo steroids have been reacted with morpholine and piperidine respectively, as a result of which the 3α-hydroxy-16β-moropholino-17-keto-etiocholane (melting-point 234–235° C.), the 3:17-diketo-16β-morpholino-etiocholane (melting-point 214–215° C.), the 3α-hydroxy-16β-piperidino-17-keto-etiocholane (melting-point 212–214° C.) and the 3:17-diketo-16β-piperidino-etiocholane (melting-point 198–200° C.) have been prepared.

Reduction of the 3α-hydroxy-17-keto compounds by means of potassium borohydride yields the 3α:17β-dihydroxy-16β-morpholino-etiocholane (melting-point 210–212° C.) and the 3α:17-dihydroxy-16β-piperidino-etiocholane (melting-point 185–186° C.).

*Example VIII (Addendum)*

Reduction of the 3:17-diketo compounds after protecting the 3-keto groups by formation of a ketal resulted in 3-keto-16β-morpholino-17β-hydroxy-etiocholane M.P. 229–230° C. and 3-keto-16β-piperidino-17β-hydroxy-etiocholane M.P. 185–186° C. respectively.

*Example IX*

To a solution of 30 gm. of oestrone enol diacetate in 300 ml. of $CH_2Cl_2$ was added rapidly with stirring 5.1 ml. of bromine in 40 ml. of methylene dichloride. The solution was then distilled to dryness under reduced pressure and the residue washed with a little ether and crystallised from methanol. There was obtained the 16α-bromo-oestrone-3-acetate with melting-point 170–171° C.

In the manner as described in Example I this compound has been converted into the 16β-morpholino-oestrone (melting-point 227–229° C.) and the 16β-piperidino-oestrone (melting-point 215–217° C.).

By reduction of these compounds by means of potassium borohydride have been obtained 16β-morpholino-oestradiol (melting-point 295° C. decomposition) and 16β-piperidino-oestradiol (melting-point 298° C. decomposition).

Example X

A solution of 4 gm. of 16-isonitroso-dehydro-epiandrosterone (melting-point 245° C.) in 300 ml. of acetic acid was shaken in an atmosphere of hydrogen with 1 gm. platinum black for 2 days until uptake of hydrogen ceased (nearly 4 moles). After removal of the acetic acid under reduced pressure the residue was extracted with dilute hydrochloric acid and the extract basified. The product was collected and acetylated to give the $\Delta^5$-3β:17β-diacetoxy-16-acetamido-androstane with melting-point 271° C.

I claim:
1. Compounds selected from the group consisting of 3-keto-16α-piperidino-17β-hydroxy-androstane and acid-addition salts thereof.
2. Compounds selected from the group consisting of 3α,17β-dihydroxy-16α-morpholino-etiocholane and acid-addition salts thereof.
3. Compounds selected from the group consisting of 3,17-diketo-16α-piperidino-androstane and acid-addition salts thereof.
4. Compounds selected from the group consisting of 3-keto-16β-piperidino-17β-hydroxy-androstane and acid-addition salts thereof.
5. Compounds selected from the group consisting of 3α,17β-dihydroxy-16β-morpholino-etiocholane and acid-addition salts thereof.
6. Compounds selected from the group consisting of 3,17-diketo-16β-piperidino-androstane and acid-addition salts thereof.
7. Compounds selected from the group consisting of steroids of the general formula:

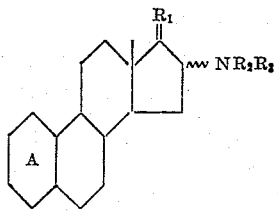

in which $R_1$ is selected from the group consisting of H(OH), H (O-lower acyl), and =O, $NR_2R_3$ is selected from the group consisting of a morpholino-, and a piperidino-radical, Ring A has a configuration selected from the group consisting of:

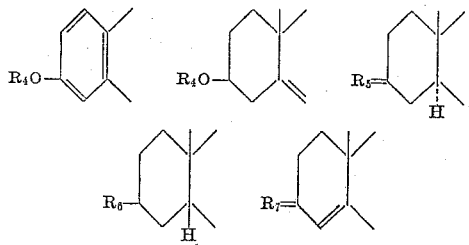

in which $R_4$ is selected from the group consisting of H, and lower acyl, $R_5$ is selected from the group consisting of H(βOH), H(βO-lower acyl), and =O, $R_6$ is selected from the group consisting of H(αOH), H(αO-lower acyl), and =O, $R_7$ is selected from the group consisting of H(OH) and =O, and salts of these compounds.

References Cited in the file of this patent

Noller: Chemistry of Organic Compounds, second edition (1957), W. B. Saunders Company, Philadelphia, Pa., pp. 228–30 and 475–86.

UNITED STATES PATENT OFFICE
CERTIFICATE OF CORRECTION

Patent No. 3,026,318                         March 20, 1962

Colin Leslie Hewett

It is hereby certified that error appears in the above numbered patent requiring correction and that the said Letters Patent should read as corrected below.

Column 8, line 23, for "(BO-lower acyl)" read -- (βO-lower acyl) --.

Signed and sealed this 3rd day of July 1962.

(SEAL)
Attest:

ERNEST W. SWIDER
Attesting Officer

DAVID L. LADD
Commissioner of Patents